United States Patent
Katanguri et al.

(10) Patent No.: US 12,546,677 B2
(45) Date of Patent: Feb. 10, 2026

(54) POWER OPERATION METHODOLOGY FOR ELECTRIC PRESSURE CONTROL EQUIPMENT

(71) Applicant: Schlumberger Technology Corporation, Sugar Land, TX (US)

(72) Inventors: Suman Katanguri, Sugar Land, TX (US); Matthew Givens, Houston, TX (US); Matthew Olson, Cypress, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 335 days.

(21) Appl. No.: 18/299,425

(22) Filed: Apr. 12, 2023

(65) Prior Publication Data

US 2024/0344918 A1 Oct. 17, 2024

(51) Int. Cl.
*G01M 3/28* (2006.01)
*E21B 21/08* (2006.01)
*H01M 10/46* (2006.01)

(52) U.S. Cl.
CPC .......... *G01M 3/2815* (2013.01); *E21B 21/08* (2013.01); *H01M 10/46* (2013.01); *H01M 2220/10* (2013.01)

(58) Field of Classification Search
CPC .. G01M 3/2815; E21B 21/08; E21B 33/0355; E21B 34/16; E21B 41/00; E21B 41/0085; H01M 10/46; H01M 2220/10
See application file for complete search history.

(56) References Cited

U.S. PATENT DOCUMENTS

| | | |
|---|---|---|
| 11,313,206 B2 | 4/2022 | Fripp |
| 11,486,788 B2 | 11/2022 | Haslanger |
| 11,513,024 B2 | 11/2022 | Rogers et al. |
| 11,555,372 B1 | 1/2023 | Al-Mousa |
| 2015/0308212 A1 | 10/2015 | Maunus |
| 2016/0265300 A1 | 9/2016 | Affleck |
| 2016/0326826 A1 | 11/2016 | Wood |
| 2018/0073320 A1* | 3/2018 | Holmes ............... E21B 34/16 |
| 2019/0032436 A1 | 1/2019 | Daley |
| 2022/0074297 A1* | 3/2022 | Zheng ............... E21B 41/00 |
| 2022/0145730 A1 | 5/2022 | Benson |
| 2022/0195848 A1 | 6/2022 | Olson |
| 2024/0344443 A1 | 10/2024 | Katanguri |
| 2024/0384618 A1 | 11/2024 | Katanguri |

FOREIGN PATENT DOCUMENTS

| | | | |
|---|---|---|---|
| EP | 3077612 B1 | 5/2020 | |
| NO | 341435 B1 * | 11/2017 | ............ E21B 44/00 |
| WO | 2014147406 A2 | 9/2014 | |

(Continued)

OTHER PUBLICATIONS

English Translation of "NO-341435-B1" (Year: 2017).*

(Continued)

*Primary Examiner* — Charles R Kasenge
(74) *Attorney, Agent, or Firm* — Jeffrey D. Frantz

(57) ABSTRACT

A method includes selecting an operation mode for a pressure control equipment and determining whether a power distribution system has sufficient power available to support the selected operation mode.

15 Claims, 3 Drawing Sheets

(56) References Cited

FOREIGN PATENT DOCUMENTS

| WO | 2021178817 A1 | 9/2021 |
| WO | 2022159567 A1 | 7/2022 |

OTHER PUBLICATIONS

Beim et al., "Improving Performance—Electrification of Well Control Equipment", IADC/SPE-212506-MS, SPE/IADC International Drilling Conference and Exhibition, Mar. 2023, 10 pages.

Givens et al., "Pressure On-Demand—Hybrid Electric BOP Control Systems", IADC/SPE-212555-MS, SPE/IADC International Drilling Conference and Exhibition, Mar. 2023, 8 pages.

Search Report and Written Opinion of International Patent Application No. PCT/US2024/023665 dated Jul. 18, 2024, 12 pages.

Search Report and Written Opinion of International Patent Application No. PCT/US2024/022579 dated Jul. 23, 2024, 10 pages.

\* cited by examiner

POWER OPERATION METHODOLOGY FOR ELECTRIC PRESSURE CONTROL EQUIPMENT

BACKGROUND

Drilling rigs are used to bore into the earth to create a well and then to complete and extract hydrocarbons from the well. Drilling rigs include various mechanical devices to accomplish these functions, such as draw works, top drives, pumps, etc., which may be powered electrically. The drilling rigs also include electrical components such as control panels, sensors, processors, etc., also powered by electricity. Where available, such electrical power is provided by connection to a power grid. However, land rigs may be positioned in remote locations, where grid access may be unavailable or for other reasons difficult to obtain. Providing power lines running to offshore rigs may likewise not be an option. Accordingly, diesel generators are used in such situations to power the rig.

Safety equipment is also provided on the drilling rigs. Generally, this safety equipment is configured to operate even in the absence of an active source of electrical power, e.g., the connection to the grid is interrupted, the generators go offline, etc. Moreover, the safety equipment may call for power at a greater rate than is practical for the electrical power source to provide on demand. Accordingly, the safety equipment may be powered using stored hydraulic energy. For example, hydraulic accumulators may be provided, and hydraulic fluid may be pumped into the accumulators at high pressure when power is available. In an emergency event, the energy stored in the accumulators may be delivered rapidly to the safety equipment, even if electrical power has been lost.

A blowout preventer (BOP) provides an example of such safety equipment. A BOP positioned at the wellhead may have one or more rams that are configured to shear a tubular extending therethrough, thereby preventing fluid from escaping from the well into the ambient environment in an emergency situation. In the event of a power loss, valves are operated to direct stored hydraulic fluid from the accumulators to the shear rams, which in turn actuate and seal the BOP.

However, as wells become more complex and BOP stacks become larger, the size of the accumulators called for to deliver the large amounts of energy used to actuate the shear rams can present a challenge. In offshore contexts, rig space is at a high premium, and thus it may be desirable to avoid devoting large portions of the rig to emergency accumulators. In land-based drilling, such large accumulators can present a transportation and space issue as well. Moreover, usable volume constraints set forth from API regulations require additional and/or larger accumulators to meet system requirements. Accordingly, there is a need to replace BOP accumulator systems with more efficient, cost competitive, battery powered pumping systems to overcome usable volume constraints and ever-increasing BOP shear requirements.

SUMMARY

According to one or more embodiments of the present disclosure, a method includes selecting an operation mode for a pressure control equipment, and determining whether a power distribution system has sufficient power available to support the selected operation mode.

According to one or more embodiments of the present disclosure, a system includes: a pressure control equipment, a processing system in communication with the pressure control equipment, and a power distribution system connected to the processing system, wherein the power distribution system includes: rig power, a stored electrical energy system, and at least one power generator, wherein the processing system includes: a processor, a non-transitory computer-readable medium in communication with the processor, and processor-executable instructions stored on the non-transitory computer readable medium that instruct the processor to automatically distribute power from the power distribution system to the pressure control equipment according to a selected operation mode for the pressure control equipment.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

In the specification and appended claims, the terms "connect," "connection," "connected," "in connection with," and "connecting," are used to mean "in direct connection with," in connection with via one or more elements." The terms "couple," "coupled," "coupled with," "coupled together," and "coupling" are used to mean "directly coupled together," or "coupled together via one or more elements." The term "set" is used to mean setting "one element" or "more than one element." As used herein, the terms "up" and "down," "upper" and "lower," "upwardly" and "downwardly," "upstream" and "downstream," "uphole" and "downhole," "above" and "below," "top" and "bottom," and other like terms indicating relative positions above or below a given point or element are used in this description to more clearly describe some embodiments of the disclosure. Commonly, these terms relate to a reference point at the surface from which drilling operations are initiated as being the top point and the total depth being the lowest point, wherein the well (e.g., wellbore, borehole) is vertical, horizontal, or slanted relative to the surface.

In general, embodiments of the present disclosure may avoid or reduce the dependency on hydraulic accumulators in drilling rigs. More specifically, one or more embodiments of the present disclosure includes a power operation methodology that automatically distributes power from a power distribution system to an electrically actuated pressure control equipment according to a selected operation mode for the pressure control equipment.

Well Construction System

Figure 1:
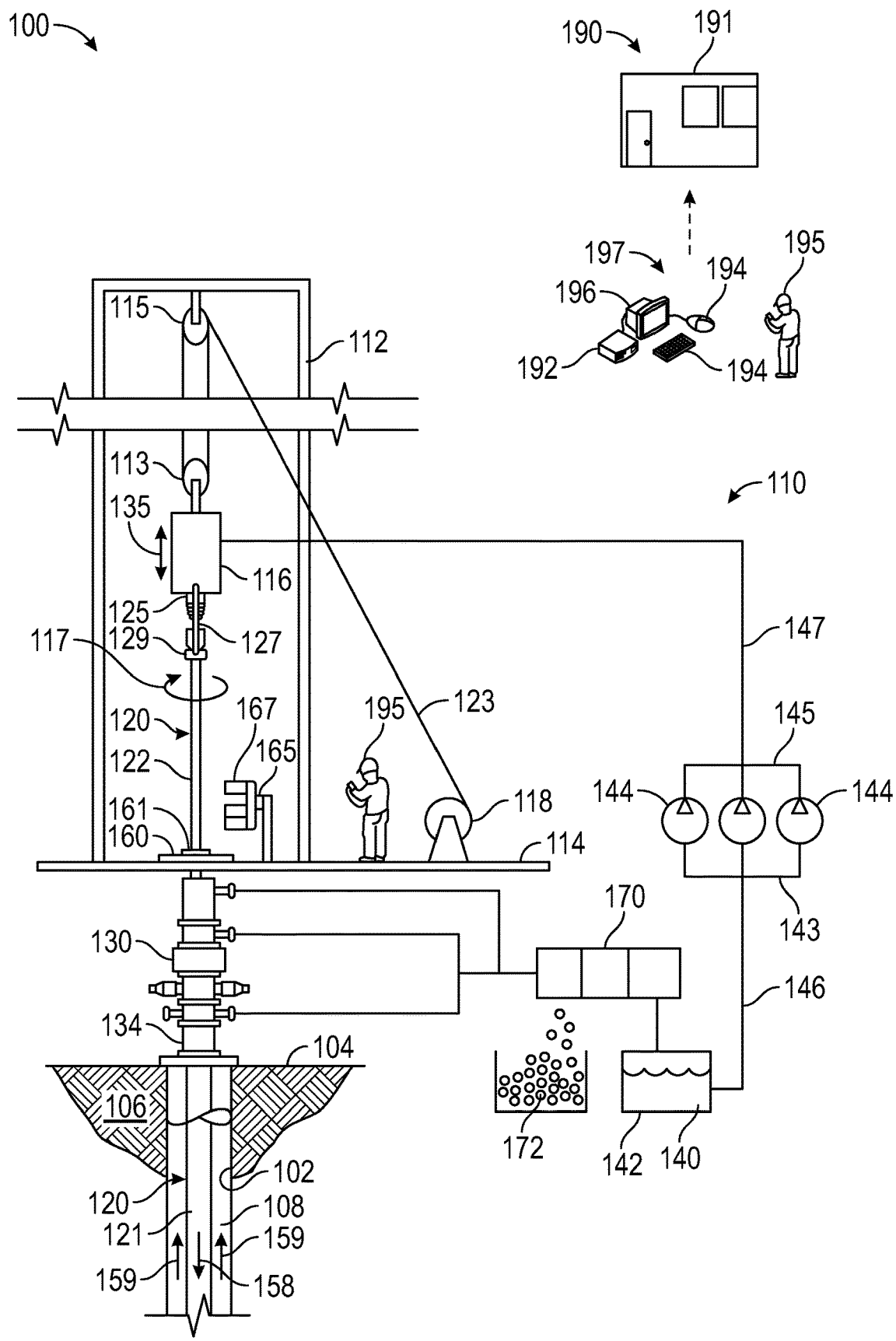
FIG. 1 shows an example of a well construction system according to one or more embodiments of the present disclosure.

Referring now to FIG. 1, an example of a well construction system 100 according to one or more embodiments of the present disclosure is shown. The well construction system 100 represents an example environment in which one or more aspects of the present disclosure described below may be implemented. The well construction system 100 may be or comprise a drilling rig and associated wellsite equipment. Although the well construction system 100 is depicted as an onshore implementation, the aspects described below are also applicable to offshore implementations.

The well construction system 100 is depicted in relation to a wellbore 102 formed by rotary and/or directional drilling from a wellsite surface 104 and extending into a subterranean formation 106. The well construction system 100 includes surface equipment 110 located at the wellsite surface 104 and a drill string 120 suspended within the wellbore 102. The surface equipment 110 may include a mast, a derrick, and/or another support structure 112 disposed over a rig floor 114. The drill string 120 may be suspended within the wellbore 102 from the support structure 112. The support structure 112 and the rig floor 114 are collectively supported over the wellbore 102 by legs and/or other support structures (not shown).

The drill string 120 may comprise a bottom-hole assembly (BHA) (not shown) and means 122 for conveying the BHA within the wellbore 102. The conveyance means 122 may comprise a plurality of individual tubulars, such as drill pipe, drill collars, heavy-weight drill pipe (HWDP), wired drill pipe (WDP), tough logging condition (TLC) pipe, and/or other means for conveying the BHA within the wellbore 102. A downhole end of the BHA may include or be coupled to a drill bit (not shown). Rotation of the drill bit and the weight of the drill string 120 collectively operate to form the wellbore 102.

The support structure 112 may support a driver, such as a top drive 116, operable to connect (perhaps indirectly) with an upper end of the drill string 120, and to impart rotary motion 117 and vertical motion 135 to the drill string 120, including the drill bit. However, another driver, such as a kelly (not shown) and a rotary table 160, may be utilized in addition to or instead of the top drive 116 to impart the rotary motion 117 to the drill string 120. The top drive 116 and the connected drill string 120 may be suspended from the support structure 112 via a hoisting system or equipment, which may include a traveling block 113, a crown block 115, and a draw works 118 storing a support cable or line 123.

The top drive 116 may comprise a grabber, a swivel (neither shown), elevator links 127 terminating with an elevator 129, and a drive shaft 125 operatively connected with a prime mover (not shown). The drive shaft 125 may be selectively coupled with the upper end of the drill string 120 and the prime mover may be selectively operated to rotate the drive shaft 125 and the drill string 120 coupled with the drive shaft 125. Hence, during drilling operations, the top drive 116, in conjunction with operation of the draw works 118, may advance the drill string 120 into the formation 106 to form the wellbore 102. The elevator links 127 and the elevator 129 of the top drive 116 may handle tubulars (e.g., drill pipes, drill collars, casing joints, etc.) that are not mechanically coupled to the drive shaft 125. For example, when the drill string 120 is being tripped into or out of the wellbore 102, the elevator 129 may grasp the tubulars of the drill string 120 such that the tubulars may be raised and/or lowered via the hoisting equipment mechanically coupled to the top drive 116.

An iron roughneck 165 may be positioned on the rig floor 114. The iron roughneck 165 may comprise a torquing portion 167, such as may include a spinner and a torque wrench comprising a lower tong and an upper tong. The torquing portion 167 of the iron roughneck 165 may be moveable toward and at least partially around the drill string 120, such as may permit the iron roughneck 165 to make up and break out connections of the drill string 120. The torquing portion 167 may also be moveable away from the drill string 120, such as may permit the iron roughneck 165 to move clear of the drill string 120 during drilling operations.

A set of slips 161 may be located on the rig floor 114, such as may accommodate therethrough the drill string 120 during tubular make up and break out operations, tubular running operations, and the drilling operations. The slips 161 may be in an open position during running and drilling operations to permit advancement of the drill string 120, and in a closed position to clamp the upper end (e.g., uppermost tubular) of the drill string 120 to thereby suspend and prevent advancement of the drill string 120 within the wellbore 102, such as during the make up and break out operations.

The well construction system 100 may further include a drilling fluid circulation system or equipment operable to circulate fluids between the surface equipment 110 and the drill bit during drilling and other operations. For example, the drilling fluid circulation system may be operable to inject a drilling fluid 140 from the wellsite surface 104 into the wellbore 102 via an internal fluid passage 121 extending longitudinally through the drill string 120. The drilling fluid circulation system may comprise a pit, a tank, and/or other fluid container 142 holding the drilling fluid (i.e., mud) 140, and one or more pump units 144 operable to move the drilling fluid 140 from the container 142 into the wellbore 102. The drilling fluid 140 may be drawn from the container 142 via a suction fluid conduit 146 and distributed among the pump units 144 via a suction manifold 143. The drilling fluid 140 may be discharged from the pump units 144 into a discharge manifold 145 and transferred to the top drive 116 via a discharge fluid conduit 147. The drilling fluid 140 may then flow through an internal passage of the top drive 116 into the fluid passage 121 of the drill string 120.

During drilling operations, the drilling fluid 140 may continue to flow downhole through the internal passage 121 of the drill string 120, as indicated by directional arrow 158. The drilling fluid 140 may exit the BHA via ports in the drill bit and then circulate uphole through an annular space 108 of the wellbore 102 defined between an exterior of the drill string 120 and the sidewall of the wellbore 102, such flow being indicated by directional arrows 159. In this manner, the drilling fluid lubricates the drill bit and carries formation cuttings uphole to the wellsite surface 104.

The well construction system 100 may further include pressure control equipment 130 for maintaining well pressure control and for controlling fluid being discharged from the wellbore 102. According to one or more embodiments of the present disclosure, the pressure control equipment 130 may be electrically actuated, for example. The pressure control equipment 130 may be mounted on top of a wellhead 134. The returning drilling fluid may exit the annulus 108 via one or more valves of the pressure control equipment 130, such as a bell nipple, a rotating control device (RCD), and/or a ported adapter (e.g., a spool, cross adapter, a wing valve, etc.) located below one or more portions of a blowout preventer (BOP) stack. The returning drilling fluid may then pass through drilling fluid reconditioning equipment 170 to be cleaned of drill cuttings 172 (i.e., formation particles) and reconditioned before returning to the fluid container 142.

The surface equipment 110 of the well construction system 100 may also comprise a control center 190 from which various portions of the well construction system 100, such as the top drive 116, the hoisting system, the tubular handling system, the drilling fluid circulation system, the well control system, the BHA, among other examples, may be monitored and controlled. The control center 190 may be located on the rig floor 114 or another location of the well construction system 100, such as the wellsite surface 104. The control center 190 may comprise a facility 191 (e.g., a room, a cabin, a trailer, etc.) containing a control workstation 197, which may be operated by a human wellsite operator 195 to monitor and control various wellsite equipment or portions of the well construction system 100. The control workstation 197 may comprise or be communicatively connected with a processing device 192 (e.g., a controller, a computer, etc.), such as may be operable to receive, process, and output information to monitor operations of and provide control to one or more portions of the well construction system 100. For example, the processing device 192 may be communicatively connected with the various surface and downhole equipment described herein, and may be operable to receive signals from and transmit signals to such equipment to perform various operations described herein. The processing device 192 may store executable program code, instructions, and/or operational parameters or setpoints, including for implementing one or more aspects of methods and operations described herein. The processing device 192 may be located within and/or outside of the facility 191.

The control workstation 197 may be operable for entering or otherwise communicating control commands to the processing device 192 by the wellsite operator 195, and for displaying or otherwise communicating information from the processing device 192 to the wellsite operator 195. The control workstation 197 may comprise a plurality of human-machine interface (HMI) devices, including one or more input devices 194 (e.g., a keyboard, a mouse, a joystick, a touchscreen, etc.) and one or more output devices 196 (e.g., a video monitor, a touchscreen, a printer, audio speakers, etc.). Communication between the processing device 192, the input and output devices 194, 196, and the various wellsite equipment may be via wired and/or wireless communication means. However, for clarity and ease of understanding, such communication means are not depicted, and a person having ordinary skill in the art will appreciate that such communication means are within the scope of the present disclosure.

Well construction systems within the scope of the present disclosure may include more or fewer components than as described above and depicted in FIG. 1. Additionally, various equipment and/or subsystems of the well construction system 100 shown in FIG. 1 may include more or fewer components than as described above and depicted in FIG. 1. For example, various engines, motors, hydraulics, actuators, valves, and/or other components not explicitly described herein may be included in the well construction system 100, and are within the scope of the present disclosure.

Processing System

Figure 2:
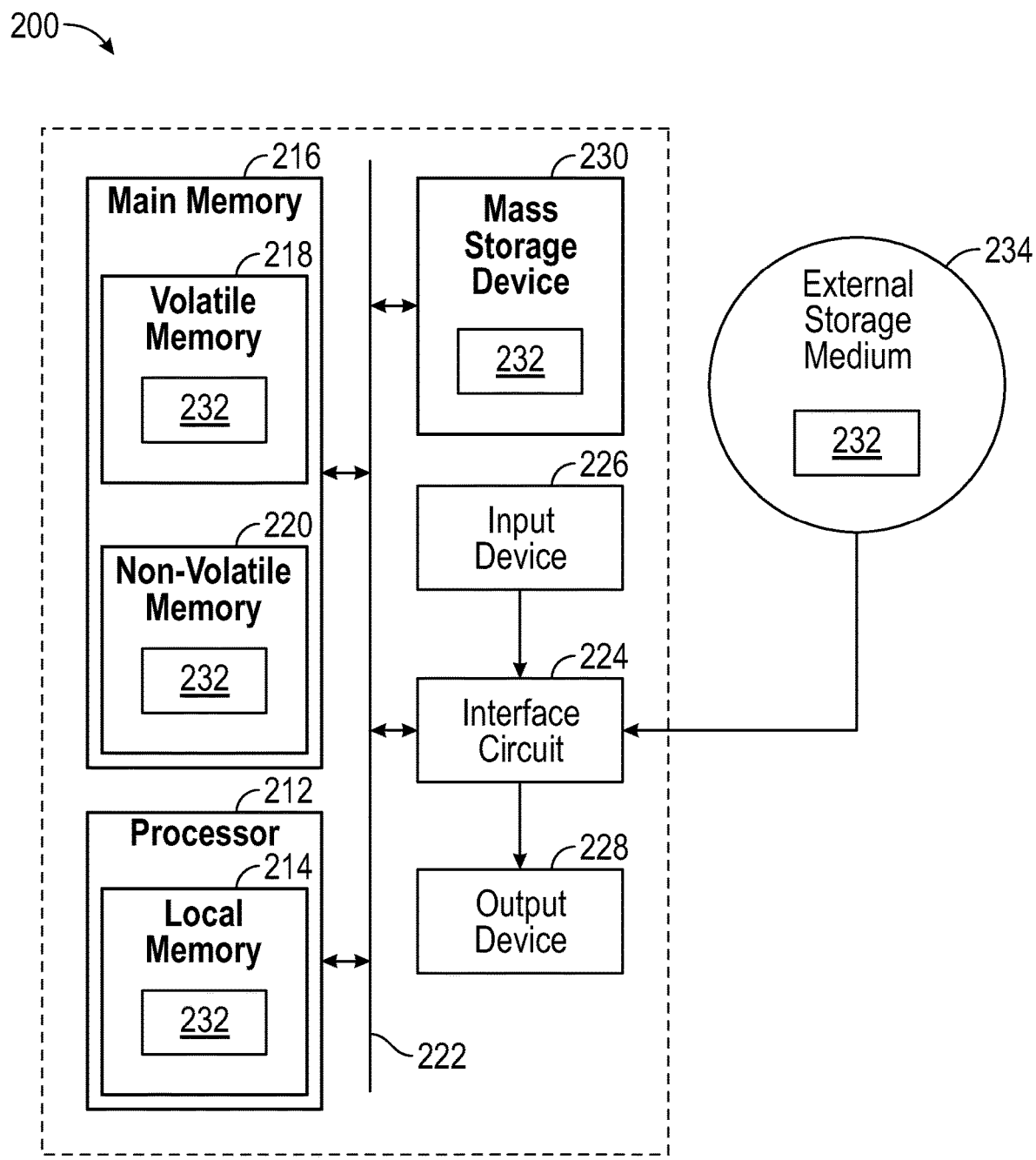
FIG. 2 shows an example of a processing system according to one or more embodiments of the present disclosure.

Referring now to FIG. 2, an example of a processing system 200 according to one or more embodiments of the present disclosure is shown. The processing system 200 may be or form at least a portion of one or more processing devices, equipment controllers, and/or other electronic devices shown in one or more of the FIGS. 1-2. Accordingly, the following description refers to FIGS. 1-2, collectively.

The processing system 200 may be or comprise, for example, one or more processors, controllers, special-purpose computing devices, PCs (e.g., desktop, laptop, and/or tablet computers), personal digital assistants, smartphones, inter-process communications (IPCs), programmable logic controllers (PLCs), servers, internet appliances, and/or other types of computing devices. The processing system 200 may be or form at least a portion of the processing device 192. The processing system 200 may be or form at least a portion of local controllers. Although it is possible that the entirety of the processing system 200 is implemented within one device, it is also contemplated that one or more components or functions of the processing system 200 may be implemented across multiple devices, some or an entirety of which may be at the wellsite and/or remote from the wellsite.

The processing system 200 may comprise a processor 212, such as a general-purpose programmable processor. The processor 212 may comprise a local memory 214, and may execute machine-readable and executable program code instructions 232 (i.e., computer program code) present in the local memory 214 and/or another memory device. The processor 212 may execute, among other things, the program code instructions 232 and/or other instructions and/or programs to implement the example methods, processes, and/or operations described herein. The program code instructions 232, when executed by the processor 212 of the processing system 200, may also or instead cause the processor 212 to receive, record, and process (e.g., analyze) sensor data (e.g., sensor measurements), compare the sensor data, and output data and/or information indicative of an operational state or power need of the pressure control equipment 130, for example.

The processor 212 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples.

The processor 212 may be in communication with a main memory 216, which may include a volatile memory 218 and a non-volatile memory 220, perhaps via a bus 222 and/or other communication means. The volatile memory 218 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 220 may be, comprise, or be implemented by read-only memory (ROM), optical drives, hard disc drives, solid-state drives, flash memory, and/or other types of memory devices. One or more memory controllers (not shown) may control access to the volatile memory 218 and/or non-volatile memory 220.

The processing system 200 may also comprise an interface circuit 224, which is in communication with the processor 212, such as via the bus 222. The interface circuit 224 may be, comprise, or be implemented by various types of standard interfaces, such as an Ethernet interface, a universal serial bus (USB), a third generation input/output (3GIO) interface, a wireless interface, a cellular interface, and/or a satellite interface, among others. The interface circuit 224 may comprise a graphics driver card. The interface circuit 224 may comprise a communication device, such as a modem or network interface card to facilitate exchange of data with external computing devices via a network (e.g., Ethernet connection, digital subscriber line (DSL), telephone line, coaxial cable, cellular telephone system, satellite, etc.).

The processing system 200 may be in communication with various sensors, video cameras, actuators, processing devices, equipment controllers, and other devices of the well construction system 100 via the interface circuit 224. The interface circuit 224 can facilitate communications between the processing system 200 and one or more devices by utilizing one or more communication protocols, such as an Ethernet-based network protocol (such as ProfiNET, OPC, OPC/UA, Modbus TCP/IP, EtherCAT, UDP multicast, Siemens S7 communication, or the like), a proprietary communication protocol, and/or another communication protocol.

One or more input devices 226 may also be connected to the interface circuit 224. The input devices 226 may permit human wellsite operators 195 to enter the program code instructions 232, which may be or comprise control commands, operational parameters, pumping operations, operational health thresholds, and/or other operational setpoints. The program code instructions 232 may further comprise modeling or predictive routines, equations, algorithms, processes, applications, and/or other programs operable to perform example methods and/or operations described herein. The input devices 226 may be, comprise, or be implemented by a keyboard, a mouse, a joystick, a touchscreen, a track-pad, a trackball, an isopoint, and/or a voice recognition system, among other examples. One or more output devices 228 may also be connected to the interface circuit 224. The output devices 228 may permit for visualization or other sensory perception of various data, such as sensor data, status data, and/or other example data. The output devices 228 may be, comprise, or be implemented by video output devices (e.g., an LCD, an LED display, a CRT display, a touchscreen, etc.), printers, and/or speakers, among other examples. The one or more input devices 226 and the one or more output devices 228 connected to the interface circuit 224 may, at least in part, facilitate the HMIs described herein.

The processing system 200 may comprise a mass storage device 230 for storing data and program code instructions 232. The mass storage device 230 may be connected to the processor 212, such as via the bus 222. The mass storage device 230 may be or comprise a tangible, non-transitory storage medium, such as a floppy disk drive, a hard disk drive, a compact disk (CD) drive, and/or digital versatile disk (DVD) drive, among other examples. The processing system 200 may be communicatively connected with an external storage medium 234 via the interface circuit 224. The external storage medium 234 may be or comprise a removable storage medium (e.g., a CD or DVD), such as may be operable to store data and program code instructions 232.

As described above, the program code instructions 232 and other data (e.g., sensor data or measurements database) may be stored in the mass storage device 230, the main memory 216, the local memory 214, and/or the external storage medium 234. Thus, the processing system 200 may be implemented in accordance with hardware (perhaps implemented in one or more chips including an integrated circuit, such as an ASIC), or may be implemented as software or firmware for execution by the processor 212. In the case of firmware or software, the implementation may be provided as a computer program product including a non-transitory, computer-readable medium or storage structure embodying computer program code instructions 232 (i.e., software or firmware) thereon for execution by the processor 212. The program code instructions 232 may include program instructions or computer program code that, when executed by the processor 212, may perform and/or cause performance of example methods, processes, and/or operations described herein.

Power Operation Methodology

Figure 3:
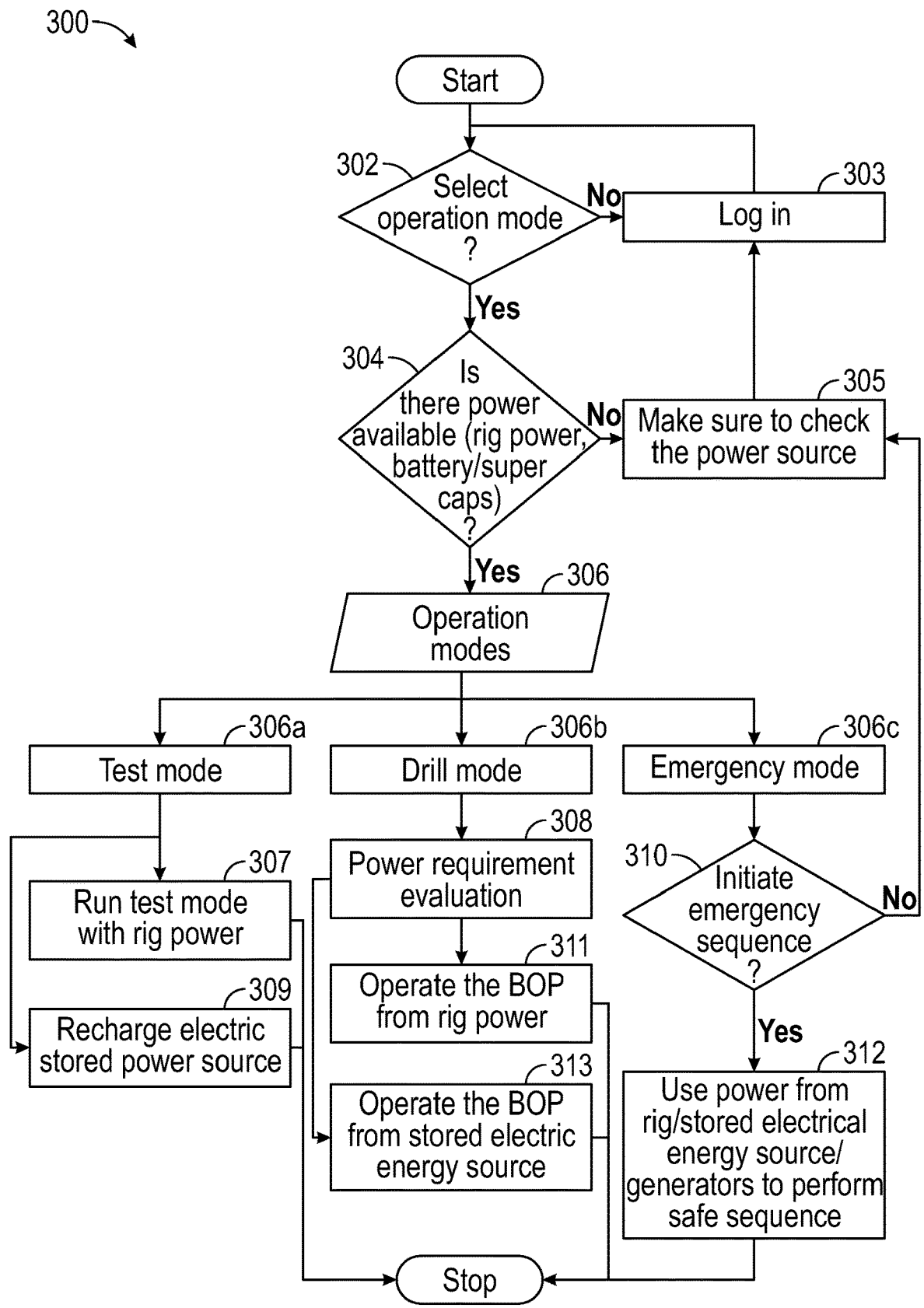
FIG. 3 shows a flow chart of a power operation methodology according to one or more embodiments of the present disclosure.

Referring now to FIG. 3, a flow chart of a power operation methodology 300 according to one or more embodiments of the present disclosure is shown. An illustrative order of the power operation methodology 300 is provided below; however, one or more portions of the power operation methodology 300 may be performed in a different order, combined, repeated, or omitted without departing from the scope of the present disclosure.

In a power operation methodology 300 according to one or more embodiments of the present disclosure, an operation mode for a pressure control equipment 130 is selected, as in 302. According to one or more embodiments of the present disclosure, the pressure control equipment 130 may be electrically actuated and may include a blowout preventer, a blowout preventer stack, a blowout preventer control system, or any of the pressure control equipment 130 as previously described, for example. According to one or more embodiments of the present disclosure, the operation mode 306 may be selected from a test mode 306a, a drill mode 306b, or an emergency mode 306c, for example and as further described below. According to one or more embodiments of the present disclosure, the operation mode 306 may be selected by the operator 195 of the pressure control equipment 130, or the operation mode 306 may be selected automatically based on a status or operational state of the pressure control equipment 130, for example.

According to one or more embodiments of the present disclosure, during the test mode 306a, functions of the pressure control equipment 130 are tested to ensure that they are working properly. During the test mode 306a, a limited number of functions of the pressure control equipment 130 are in operation, as compared to the number of functions of the pressure control equipment 130 that are in operation during normal drilling operations, for example. According to one or more embodiments of the present disclosure, the drill mode 306b supports normal drilling operations of the pressure control equipment 130, for example. According to one or more embodiments of the present disclosure, the emergency mode 306c may trigger an emergency sequence to secure the well after communication and/or power have been lost or severed from the drilling rig, for example.

According to one or more embodiments of the present disclosure, the pressure control equipment 130 is in communication with the processing system 200, and a power distribution system is connected to the processing system 200. As previously described, the processing system 200 may include a main memory 216 having volatile memory 218 and non-volatile memory 220, and a processor 212 having a local memory 214, for example. According to one or more embodiments of the present disclosure, the processor 212 of the processing system 200 may be configured to execute instructions stored in the memory or in a non-transitory computer-readable medium, such as to automatically distribute power from the power distribution system to the pressure control equipment 130 according to the selected operation mode for the pressure control equipment 130, as further described below.

According to one or more embodiments of the present disclosure, the power distribution system connected to the processing system 200 includes rig power, a stored electrical energy system, and at least one power generator. According to one or more embodiments of the present disclosure, the stored electrical energy system may include a battery, a supercapacitor, and/or a hydrogen fuel cell, for example.

As further shown in FIG. 3, if an operation mode is not selected at 302, the operator 195 or the processing system 200 may be prompted to log in, as in 303, for example. After logging in, the operator 195 or the processing system 200 may be prompted to select an operation mode (or an operation mode may be automatically selected by the processing system 200), as in 302, according to one or more embodiments of the present disclosure.

Still referring to FIG. 3, once the operation mode for the pressure control equipment 130 is selected at 302, the processing system 200 determines whether the power distribution system has sufficient power (e.g., rig power, stored electrical energy, and/or generator power) available to support the selected operation mode 306, as in 304 for example, by evaluating a power need of the pressure control equipment 130. If the processing system 200 determines that the power distribution system has insufficient power available to support the selected operation mode 306, the operator 195 or the processing system 200 is prompted to check the corresponding power source, as in 305.

Still referring to FIG. 3, if the test mode operation mode is selected at 302, and the processing system 200 determines that there is sufficient power available to support the test mode at 304, the power operation methodology 300 according to one or more embodiments of the present disclosure proceeds to 306a. When the pressure control equipment 130 is in the test mode 306a, the power operation methodology 300 includes running the test mode with the rig power of the power distribution system, as at 307 for example, and recharging the stored electrical energy system, as at 309 for example, according to one or more embodiments of the present disclosure.

If the drill mode operation mode is selected at 302, and the processing system 200 determines that there is sufficient power available to support the drill mode at 304, the power operation methodology 300 according to one or more embodiments of the present disclosure proceeds to 306b. When the pressure control equipment 130 is in the drill mode 306b, the power operation methodology 300 according to one or more embodiments of the present disclosure proceeds to the processing system 200 evaluating a power need of the pressure control equipment 130, as at 308, for example. Thereafter, the pressure control equipment 130 operates in the drill mode using the rig power until the rig power can no longer meet the power need of the pressure control equipment 130, as at 311 for example. Moreover, the power operation methodology 300 according to one or more embodiments of the present disclosure includes operating the pressure control equipment 130 using the stored electrical energy system as a back-up to the rig power, as at 313 for example.

If the emergency mode operation mode is selected at 302, and the processing system 200 determines that there is sufficient power available to support the emergency mode at 304, the power operation methodology 300 according to one or more embodiments of the present disclosure proceeds to 306c. When the pressure control equipment 130 is in the emergency mode 306c, the power operation methodology 300 according to one or more embodiments of the present disclosure proceeds to initiating an emergency sequence, as at 310, for example. According to one or more embodiments of the present disclosure, the emergency sequence initiated at 310 may include an automatic safety operation for shutting in a wellbore. In one or more embodiments, the emergency sequence initiated at 310 may include one or more of a Deadman operation, an automatic shearing operation, an automatic disconnect operation, or an acoustic operation, as understood by those having ordinary skill in the art, for example. After the emergency sequence is initiated, the power operation methodology 300 proceeds to performing the emergency sequence using at least one of the stored electrical energy system, the rig power, and the at least one power generator of the power distribution system according to one or more embodiments of the present disclosure, as at 312, for example. According to one or more embodiments of the present disclosure, when the pressure control equipment is in the emergency mode 306c, rig power from the power distribution system may be used to trickle charge at least a portion of the stored electrical energy system.

Still referring to FIG. 3, in other embodiments of the present disclosure, the power operation methodology 300 may include selecting the emergency mode operation mode as a result of an emergency condition after the test mode operation mode 306a or the drill mode operation mode 306b was selected at 302. In such embodiments, the power operation methodology 300 includes using the processing system to determine whether there is sufficient power available to support the emergency mode. If there is sufficient power available to support the emergency mode, the power operation methodology 300 proceeds to initiating the emergency sequence at 310 as previously described. However, if there is insufficient power available to support the emergency mode 306c, the power operation methodology 300 prompts the operator 195 or the processing system 200 to check the power source at 305, designate a viable power source, which may require logging back into the system thereafter at 303, and resume the power operation methodology 300 by selecting the emergency mode as the operation mode at 302 so that the emergency sequence may be initiated at 310. According to one or more embodiments of the present disclosure, the power available to support the emergency mode 306c may be separate from the power sources of the power distribution system that support the test mode 306a and the drill mode 306b, for example. As previously described, for example, power available from the at least one power generator of the power distribution system may be used to support the emergency mode 306c and to execute the emergency sequence according to one or more embodiments of the present disclosure.

Advantageously, the power operation methodology 300 according to one or more embodiments of the present disclosure evaluates various modes and automatically distributes optimum power without the power distribution system having to experience manual changes or initiations. As another advantage, the stored electrical energy system of the power distribution system according to one or more embodiments of the present disclosure may have a capacity of up to three times the necessary power requirement for one full operation of the pressure control equipment, making the stored electrical energy system and the related power operation methodology a reliable power source during rig power fluctuations.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method comprising:
    selecting an operation mode from a plurality of operation modes for a pressure control equipment, wherein the pressure control equipment comprises a blowout preventer (BOP) system, and wherein the plurality of operation modes comprise:
        a test mode, wherein the test mode is configured to test one or more functions of the BOP system to ensure that the one or more functions are working properly;
        a drill mode, wherein the drill mode is configured to support drilling operations of the BOP system; and
        an emergency mode, wherein the emergency mode is configured to initiate an automatic safety operation configured to shut in a wellbore; and
    determining whether a power distribution system has sufficient power available to support the selected operation mode.

2. The method of claim 1, wherein selecting the operation mode for the BOP system comprises selecting the test mode for the BOP system.

3. The method of claim 2, wherein the test mode is configured to operate a reduced number of the one or more functions of the BOP system as compared to the drilling operations.

4. The method of claim 1, wherein selecting the operation mode for the BOP system comprises selecting the drill mode for the BOP system.

5. The method of claim 4, wherein the drill mode is configured to operate the BOP system using a rig power of the power distribution system until the rig power can no longer meet a power need of the BOP system.

6. The method of claim 1, wherein selecting the operation mode for the BOP system comprises selecting the emergency mode for the BOP system.

7. The method of claim 6, wherein a power source of the power distribution system used to support the emergency mode is separate from additional power sources of the power distribution system used to support the test mode and the drill mode.

8. The method of claim 1,
    wherein the BOP system is in communication with a processing system, and
    wherein the power distribution system is connected to the processing system, the power distribution system comprising:
        rig power;
        a stored electrical energy system; and
        at least one power generator.

9. The method of claim 8, wherein the stored electrical energy system comprises at least one of: a battery; a supercapacitor; or a hydrogen fuel cell.

10. The method of claim 8, wherein selecting the operation mode comprises selecting the test mode for the BOP system, wherein the one or more functions comprise:
    running the test mode with the rig power; and
    recharging the stored electrical energy system, wherein the stored electrical energy system comprises at least one of a battery, a supercapacitor, or a hydrogen fuel cell.

11. The method of claim 8,
    wherein selecting the operation mode comprises selecting the drill mode for the BOP system;
    wherein determining whether the power distribution system has sufficient power comprises using the processing system to evaluate a power need of the BOP system; and
    wherein the drilling operations of the BOP system comprise:
        operating the BOP system in the drill mode using the rig power until the rig power can no longer meet the power need of the BOP system; and
        operating the BOP system using the stored electrical energy system as a back-up to the rig power, wherein the stored electrical energy system comprises at least one of a battery, a supercapacitor, or a hydrogen fuel cell.

12. The method of claim 8,
    wherein selecting the operation mode comprises selecting the emergency mode for the BOP system;
    wherein determining whether the power distribution system has sufficient power comprises using the processing system to determine whether there is sufficient power available to support the emergency mode; and
    wherein the method further comprises:
        initiating an emergency sequence; and
        performing the emergency sequence using at least one of: the stored electrical energy system; the rig power; or the at least one power generator, wherein the stored electrical energy system comprises at least one of a battery, a supercapacitor, or a hydrogen fuel cell.

13. The method of claim 12, further comprising using the rig power to trickle charge at least a portion of the stored electrical energy system.

14. The method of claim 12, wherein the emergency sequence comprises at least one of a Deadman operation, an automatic shearing operation, an automatic disconnect operation, or an acoustic operation.

15. The method of claim 1, wherein the BOP system is electrically actuated and comprises at least one of a BOP, a BOP stack, or a BOP control system.

* * * * *